United States Patent [19]

Nestegard et al.

[11] Patent Number: 5,773,506
[45] Date of Patent: Jun. 30, 1998

US005773506A

[54] PRESSURE SENSITIVE ADHESIVE COMPRISING A BLOCK COPOLYMER HAVING LOW MOLECULAR WEIGHT ENDBLOCKS AND ENDBLOCK-COMPATIBLE TACKIFIER OR OIL

[75] Inventors: Mark K. Nestegard; Jingjing Ma, both of Woodbury, Minn.

[73] Assignee: Minnesota Mining and Manufacturing, St. Paul, Minn.

[21] Appl. No.: 762,053

[22] Filed: Dec. 9, 1996

Related U.S. Application Data

[63] Continuation of Ser. No. 601,813, Feb. 15, 1996, abandoned, which is a continuation of Ser. No. 397,819, Mar. 3, 1995, abandoned.

[51] Int. Cl.⁶ ............... C08L 93/04; C08L 53/02; C08L 57/02; C08K 5/01
[52] U.S. Cl. ............... 524/505; 524/271; 524/274; 524/474; 524/484; 524/499; 524/575; 525/97
[58] Field of Search ................... 524/271, 274, 524/474, 484, 499, 505, 575; 525/97

[56] References Cited

U.S. PATENT DOCUMENTS

| | | |
|---|---|---|
| 3,239,478 | 3/1966 | Harlan, Jr. . |
| 3,639,517 | 2/1972 | Kitchen et al. . |
| 3,917,607 | 11/1975 | Crossland et al. ............. 260/28.5 B |
| 3,932,328 | 1/1976 | Korpman . |
| 3,985,830 | 10/1976 | Fetters et al. . |
| 4,028,292 | 6/1977 | Korpman . |
| 4,104,327 | 8/1978 | Inoue et al. ............. 260/876 B |
| 4,125,665 | 11/1978 | Bemmels et al. ............. 428/352 |
| 4,136,071 | 1/1979 | Korpman ............. 260/27 BB |
| 4,221,884 | 9/1980 | Bi et al. . |
| 4,250,272 | 2/1981 | Ewins, Jr. et al. ............. 525/89 |
| 4,296,008 | 10/1981 | St. Clair et al. ............. 524/271 |
| 4,391,949 | 7/1983 | St. Clair . |
| 4,399,249 | 8/1983 | Bildusas ............. 524/271 |
| 4,418,123 | 11/1983 | Bunnelle et al. ............. 428/517 |
| 4,444,953 | 4/1984 | St. Clair ............. 524/274 |
| 4,556,464 | 12/1985 | St. Clair ............. 524/274 |
| 4,683,268 | 7/1987 | Ahner ............. 525/237 |
| 4,699,938 | 10/1987 | Minamizaki et al. ............. 524/271 |
| 4,780,367 | 10/1988 | Lau et al. . |
| 4,939,208 | 7/1990 | Lanza et al. . |
| 4,959,412 | 9/1990 | Arter et al. ............. 525/98 |
| 5,037,411 | 8/1991 | Malcolm et al. . |
| 5,118,762 | 6/1992 | Chin . |
| 5,290,842 | 3/1994 | Sasaki et al. ............. 524/271 |
| 5,296,547 | 3/1994 | Nestegard et al. . |
| 5,342,858 | 8/1994 | Litchholt et al. ............. 521/98 |
| 5,393,787 | 2/1995 | Nestegard et al. ............. 524/575 |

FOREIGN PATENT DOCUMENTS

| | | |
|---|---|---|
| 0 457 566 | 11/1991 | European Pat. Off. . |
| 52-129795 | 10/1977 | Japan . |
| 91/13935 | 9/1991 | WIPO . |
| 93/04135 | 3/1993 | WIPO . |

*Primary Examiner*—Peter A. Szekely

[57] ABSTRACT

The present invention provides a block copolymer pressure sensitive adhesive (PSA) composition. The block copolymer has at least one midblock segment and at least one endblock segment. The midblock comprises a polymerized conjugated diene segment or hydrogenated derivative thereof. The endblock comprises a polymerized monovinyl aromatic segment having a number average molecular weight less than about 8,000. The PSA further comprises at least one tackifier or oil that is compatible with the low molecular weight endblock segment of the block copolymer. The PSA composition of the invention has a reduced elastic index and is capable of dissipating stress. This is useful in providing tapes which are capable of withstanding stresses such as those caused by temperature fluctuations, dimensional changes in the backing, or the recovery forces of a backing applied under tension. The present invention also provides a method of reducing the elastic index of a block copolymer PSA composition.

7 Claims, 1 Drawing Sheet

PRESSURE SENSITIVE ADHESIVE COMPRISING A BLOCK COPOLYMER HAVING LOW MOLECULAR WEIGHT ENDBLOCKS AND ENDBLOCK-COMPATIBLE TACKIFIER OR OIL

This is a continuation of application Ser. No. 08/601,813, filed Feb. 15, 1996, now abandoned which is a continuation of application Ser. No. 08/397,819, filed Mar. 3, 1995.

FIELD OF THE INVENTION

The present invention relates to a pressure sensitive adhesive composition comprising a block copolymer having a low molecular weight endblock and a tackifier or oil that is compatible with the low molecular weight endblock, and a tape made therefrom.

BACKGROUND OF THE INVENTION

Block copolymers are known in the art for a variety of applications including the fabrication of impact resistant packaging materials, fabrication of molded articles and formulation of adhesives. Patent and scientific literature discloses numerous molecular variations of block copolymers which are suitable for such applications. See, for example, U.S. Pat. No. 3,639,517 (Kitchen); U.S. Pat. No. 4,221,884 (Bi) and Japanese Patent 52 [1977]-129795. References which disclose the use of block copolymers to formulate adhesives include, for example, U.S. Pat. No. 4,780,367 (Lau), U.S. Pat. No. 4,444,953 (St. Clair); U.S. Pat. No. 4,556,464 (St. Clair); U.S. Pat. No. 3,239,478 (Harlan) and U.S. Pat. No. 3,932,328 (Korpman); U.S. Pat. No. 4,125,665 (Bemmels); U.S. Pat. No. 4,699,938 (Minamizaki); U.S. Pat. No. 3,917,607 (Crossland); and U.S. Pat. No. 5,342,858 (Litchholt).

For some tape applications, it is important to formulate a block copolymer adhesive to provide an adequate balance between the properties of adhesion and resistance to low stress peel. Examples of these tape applications include removable tapes, low unwind noise tapes, and tapes for use in cold temperatures. In general, the adhesives of these tapes are not able to effectively dissipate stresses such as, for example, those caused by temperature fluctuations, dimensional changes in the backing, and the recovery forces of a backing applied under tension. As a result, they may lift from a substrate to which they are applied.

A need therefore exists for a pressure sensitive adhesive composition that is able to dissipate stress. Such a pressure sensitive adhesive may be used to make a variety of different types of tapes such as removable tapes, low unwind noise tapes, tapes for use in cold temperature environments, masking tapes, packaging tapes, medical tapes and autoclave indicator tapes. Additionally, the pressure sensitive adhesive may be used to make protective sheeting, labels, and facestocks.

SUMMARY OF THE INVENTION

The present invention provides a pressure sensitive adhesive (PSA) composition that dissipates stress of the type discussed above. The PSA comprises a block copolymer having at least one midblock segment and at least one endblock segment. The midblock comprises a polymerized conjugated diene or hydrogenated derivative thereof. The endblock comprises a polymerized monovinyl aromatic segment having a number average molecular weight less than about 8,000, more preferably between about 3,000 and 7,000, and may be referred to as the "low molecular weight endblock". The PSA further comprises an effective amount of at least one tackifier or oil that is sufficiently compatible with the low molecular weight endblock. As used herein, the terms "effective amount" and "sufficiently compatible" are defined in terms of the result to be achieved, namely that the tackifier or oil reduces the elastic index of the PSA composition by at least 10% compared to the elastic index of a PSA composition that is identical except for the use of a tackifier or oil that is not endblock-compatible. As used herein, the term "endblock-compatible" means that the tackifier or oil causes a shift in the glass transition temperature ($T_g$) of the endblock. This shift may be detected using Dynamic Mechanical Analysis (DMA).

Surprisingly, the combination of the block copolymer having a low molecular weight endblock and the endblock-compatible tackifier or oil is particularly effective in providing a PSA composition having a reduced elastic index. The elastic index of an adhesive provides an indication of the ability of the adhesive to dissipate stress. As the elastic index is decreased for an adhesive system, the ability of the adhesive to dissipate stress generally improves. This is important in providing tapes that are capable of relaxing certain types of stresses without lifting away from the substrate to which the tape is applied. The stresses may be caused by, for example, temperature fluctuations, dimensional changes in the backing such as those caused by moisture uptake or loss, or the elastic recovery forces of a backing applied under tension.

Preferably, the PSA composition of the present invention has an elastic index less than about 0.7, more preferably less than 0.6, to provide an adhesive that is most effective at dissipating stress.

In addition to its ability to dissipate stress, the PSA of the present invention also tends to have a low melt viscosity and melt elasticity, thus allowing for easy high-speed melt coating.

The present invention is also directed to a film and to a tape comprising the PSA. The tape is useful in a number of applications. These applications include removable tapes, low unwind noise tapes, tapes for use in cold environments, masking tapes, packaging tapes, medical tapes, autoclave indicator tapes, labels, facestock and protective sheeting.

In one embodiment of the invention the tape comprises a transfer tape, i.e., a film having no backing. Transfer tapes are typically provided on a release carrier to facilitate their handling. The film of the transfer tape may be foamed. In another embodiment of the invention, the tape comprises a backing having a layer of the PSA coated thereon. The backing may comprise paper, cloth, foil or polymer. In either embodiment, the tape may also comprise a foamed PSA.

The present invention is further directed to a method of reducing the elastic index of a block copolymer PSA composition. This method comprises the steps of:

(1) providing a block copolymer having at least one endblock and at least one midblock, wherein the endblock comprises a polymerized monovinyl aromatic having a number average molecular weight less than 8,000 and the midblock comprises a polymerized conjugated diene or a hydrogenated derivative thereof;

(2) providing at least one tackifier or oil that is sufficiently compatible with the endblock; and (3) mixing the tackifier or oil with the block copolymer and forming a blend of an effective amount of the tackifier or oil with the endblock so as to reduce the elastic index of the resulting adhesive composition by at least about 10% as compared to the elastic index of an identical PSA composition except for the use of a tackifier or oil that is not endblock-compatible.

BRIEF DESCRIPTION OF THE DRAWING

FIG. 1 shows elastic index as a function of endblock molecular weight, molecular structure and tackifier type.

DETAILED DESCRIPTION OF THE DRAWING

Figure 1:
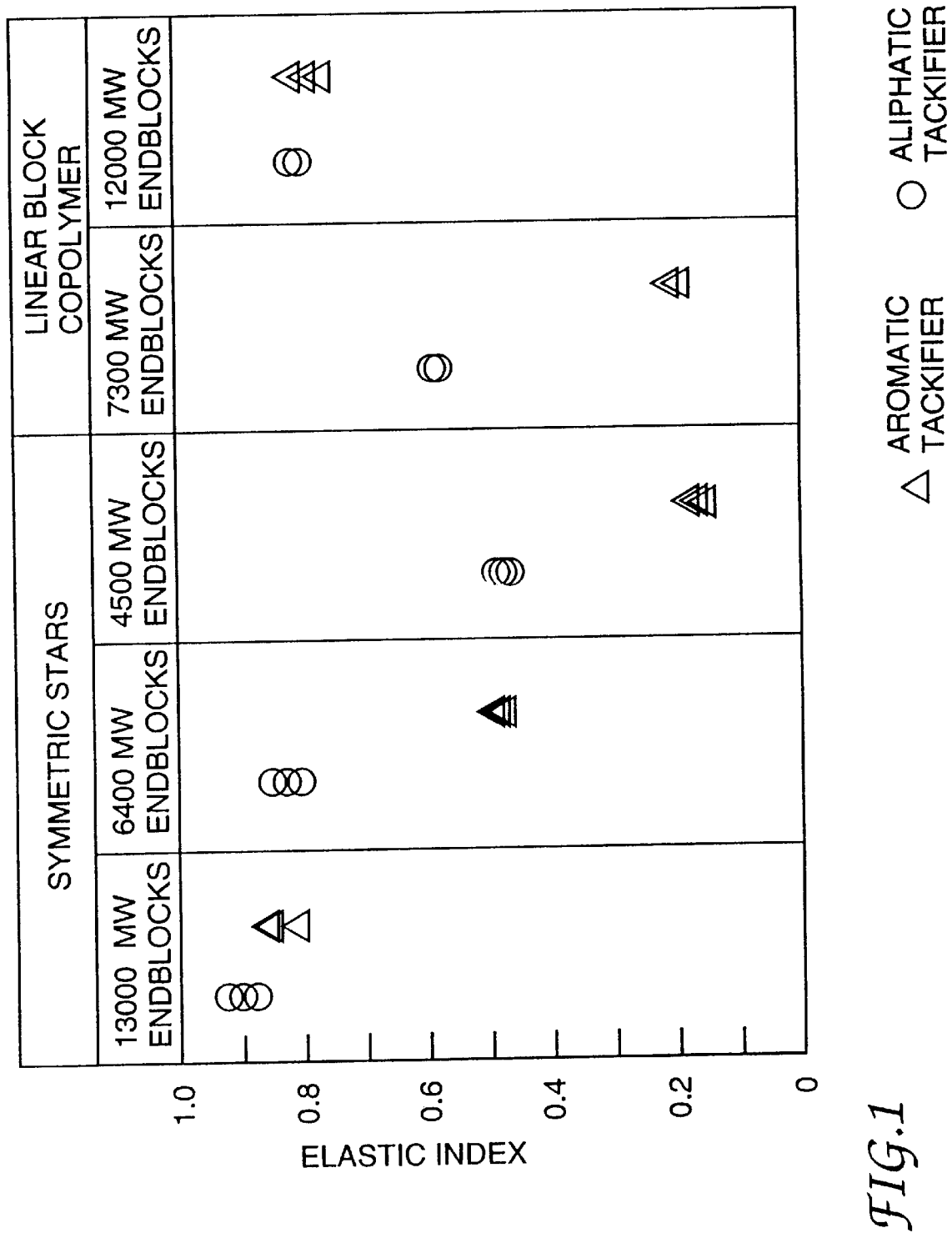
FIG. 1 provides a visual representation of the data of Example 2. More specifically.

FIG. 1 shows that the elastic index of adhesive compositions comprising block copolymers having endblock molecular weights less than about 8,000 and aromatic tackifier is greatly reduced (greater than 50%) compared to identical adhesives comprising aliphatic tackifier. The aromatic tackifier is substantially compatible with the endblock, while the aliphatic tackifier is not substantially compatible with the endblock.

FIG. 1 also shows that adhesive compositions comprising block copolymers having endblock molecular weights greater than 8,000 and aromatic tackifier do not show a noticeable reduction in elastic index compared to identical adhesive compositions comprising aliphatic tackifier.

Thus, the combination of a block copolymer having low molecular weight endblocks and endblock-compatible tackifier is particularly effective in reducing the elastic index of the adhesive composition.

Further discussion of FIG. 1 is presented in Example 2.

DETAIL DESCRIPTION OF THE INVENTION

As noted previously, the PSA composition of the invention has an elastic index that is at least 10% lower than that of an identical PSA composition except for the use of a tackifier or oil that is not endblock-compatible. This enables the composition to dissipate stress and overcomes the disadvantages of prior art compositions. The elastic index is an indication of the amount of stress a tape can dissipate from a given load over a set amount of time and is calculated as a ratio of remaining force (after 180 seconds of relaxation) to initial force. The procedure for determining the elastic index may be found in Example 2. A lower elastic index value indicates that less force remains after the period of relaxation. This in turn indicates that the adhesive has dissipated the initial force to a greater extent. When such a tape is subjected to stresses during use, it is better able to dissipate those stresses and resist peeling from the surface to which it is applied. Preferably, the elastic index of the PSA composition of the invention is less than about 0.7, more preferably less than about 0.6.

The elastic index of a particular PSA composition will depend on several factors. By manipulating these factors, the elastic index may be tailored to meet the requirements of the particular application. For example, the amount of tackifier and/or oil used in the adhesive formulation and the degree to which the tackifier or oil is compatible with the low molecular weight endblock affect the elastic index. The present invention requires that the endblock-compatible tackifier or oil be (1) provided in an effective amount and (2) sufficiently compatible with the low molecular weight endblock to provide a PSA composition that has an elastic index that is 10% lower than that of an identical PSA composition except for the use of a tackifier or oil that is not endblock-compatible. Greater reductions in elastic index may generally be achieved by increasing the amount of endblock-compatible tackifier or oil and/or increasing the degree to which it is compatible with the endblock.

A tackifier or oil is compatible in a phase if it causes a shift in the $T_g$ of that phase (assuming that the tackifier or oil and the phase do not have the same $T_g$). Preferably, the $T_g$ of the endblock is shifted to a lower temperature in the present invention. A shift in $T_g$ may be detected using techniques known in the art such as Dynamic Mechanical Analysis (DMA). An example of the use of DMA to determine glass transition temperatures may be found in U.S. Pat. No. 5,290,842. In general, the chemical structure and molecular weight of a tackifier or oil determines whether it will be compatible in a phase. For example, tackifiers prepared from aromatic compounds tend to be compatible with the endblock, the compatibility increasing with the amount of aromatic compound employed.

Another factor which affects the elastic index of the PSA composition is the degree to which the tackifier or oil is compatible with the midblock. To achieve the greatest amount of decrease in the elastic index of a PSA composition, it is preferable to employ a tackifier or oil that is compatible with both the low molecular weight endblock segment and the elastomeric midblock segment. Alternatively, a combination of tackifiers and oils may be used to provide a system that is compatible with both the endblock and midblock segments. For example, two tackifiers may be used, one of which is compatible with the endblock, the other of which is compatible with the midblock.

The tackifier may be solid or liquid. Solid tackifiers generally refer to materials which are miscible with the elastomeric block in the block copolymer, have a number average molecular weight $M_n$, of 10,000 grams per mol (g/mol) or less, a softening point above 70° C. as determined using a ring and ball apparatus, and $T_g$ of 10° C. or more as measured by differential scanning calorimetry (DSC). Liquid tackifiers are viscous materials which have a softening point between 0° C. and 70° C. as determined using a ring and ball apparatus.

Suitable tackifiers for use in the PSA of the invention may include, for example, coumarone indenes, rosin esters, aromatic resins, mixed aromatic/aliphatic resins, aromatic modified hydrocarbon resins, liquid hydrocarbon resins, liquid polyterpenes, liquid rosin esters, and liquid polystyrene resins.

Oils which may be used in the PSA of the invention include those that are well known in the art. Examples of such oils include hydrocarbon oils, such as olefinic, naphthenic, and paraffinic oils. Elastomeric oligomers are also considered to be oils for purposes of this application.

The endblock-compatible tackifier is preferably present in an amount of at least 20 parts by weight, more preferably in an amount of from about 50 to about 400 parts by weight, most preferably in an amount of from about 50 to about 200 parts by weight, per 100 parts by weight of the block copolymer. The endblock-compatible oil is preferably present in an amount of at least 5 parts by weight, more preferably in an amount of from about 5 to about 100 parts by weight, per 100 parts by weight of the block copolymer. As stated above, it is preferred that the tackifier or oil be compatible with both the endblock and midblock. A combination of endblock- and midblock-compatible tackifiers may alternatively be used. In this case, it is preferred that there be at least 20 parts by weight endblock-compatible tackifier or at least 5 parts of the endblock-compatible oil and anywhere from about 1 to about 400 parts by weight midblock-compatible tackifier per 100 parts by weight block copolymer.

Another factor which affects the elastic index is the structure of the block copolymer. More specifically, the molecular weight of the endblock and the architecture of the block copolymer affect the elastic index.

While the structure of the block copolymer used in the present invention is not critical as long as it comprises at least one endblock having a number average molecular weight less than about 8,000, more dramatic reductions in elastic index will be observed for some structures as compared to others.

For example, polymodal block copolymers (i.e., block copolymers having at least two molecular weight endblocks) wherein not all the endblocks are low molecular weight endblocks will show less of a reduction in elastic index than other structures wherein all endblocks are low molecular weight endblocks. This is demonstrated in Example 3.

In addition, the amount of diblock copolymer present in the PSA composition affects the elastic index. Diblock copolymers may be represented by the structure S-B, wherein "S" represents a polymerized monovinyl aromatic segment and "B" represents a polymerized conjugated diene segment or hydrogenated derivative thereof. When, for example, a blend of diblock (S-B) and triblock (S-B-S) copolymers is used to formulate a PSA composition, it will generally exhibit a lower elastic index than a PSA composition comprising all triblock copolymer. This is because the presence of diblock copolymer provides fewer connections between domains which function as physical crosslinks. In general, the presence of the diblock copolymer in a PSA will tend to decrease the elastic index of the composition.

Turning now to a discussion of block copolymer structures useful for the present invention, the structure may be linear (such as the diblock or triblock mentioned previously), branched, radial or star. When present as a star or radial structure, the block copolymer may be represented by the general structure $Q_nY$ where "Q" represents an arm of the block copolymer and has the structure S-B where "S" and "B" are defined above. Furthermore, "n" represents the number of arms (Q) and is at least three, and "Y" is the residue of a multifunctional coupling agent. When present as a diblock, triblock or repeating structure, the block copolymer may be represented by the structures S-B; S-B-S or $(S-B)_n$, respectively, wherein S, B, and n are as defined above. It is recognized that in the repeating structure $(S-B)_n$, the S segment is not always a terminal endblock. The invention is intended to include repeating structures wherein the low molecular weight monovinyl aromatic segment is internal to the block copolymer and thus not technically an endblock. It is also recognized that in the diblock structure S-B, the B block is not technically a midblock. The invention is also intended to include such structures.

Examples of various structures of block copolymers and methods of synthesis of the same may be found, for example, in U.S. Pat. Nos. 4,780,367 (Lau); 4,391,949 (St. Clair); 3,932,328 (Korpman); 4,028,292 (Korpman); 4,136,071 (Korpman); 5,037,411 (Malcolm); 5,118,762 (Chin); 3,985,830 (Fetters); and 4,939,208 (Lanza). These block copolymers are only useful in the present invention if they contain at least one low molecular weight endblock.

A preferred structure for the block copolymer is a polymodal, asymmetric star block copolymer such as described in U.S. Pat. No. 5,296,547. Such a star block copolymer comprises endblocks having at least two different molecular weights. When used to make the PSA of the present invention, it is required that one endblock molecular weight be less than 8,000 with the other endblock molecular weight preferably being in the range of about 5,000 to about 50,000, more preferably in the range of about 8,000 to about 35,000. In addition, it is preferred that the number of arms containing molecular weight endblocks less than about 8,000 be between about 30 and 100 percent of the total arms in the block copolymer. Furthermore, it is preferred that the polymodal, asymmetric star block copolymer comprise from about 4 to 40 percent by weight of a polymerized monovinyl aromatic homopolymer, and correspondingly from about 96 to 60 percent by weight of a polymerized conjugated diene, or hydrogenated derivative or mixtures thereof.

The monomers which comprise the polymerized monovinyl aromatic endblocks typically contain from 8 to 18 carbon atoms, and examples of useful monovinyl aromatic monomers include styrene, alpha-methylstyrene, vinyltoluene, vinylpyridine, ethylstyrene, t-butylstyrene, isopropylstyrene, dimethylstyrene, other alkylated styrenes, and the like. Presently the preferred endblocks comprise polystyrene.

The monomers which comprise the polymerized conjugated diene midblocks typically contain from 4 to 12 carbon atoms, and examples of useful conjugated diene monomers include butadiene, isoprene, ethylbutadiene, phenylbutadiene, piperylene, dimethylbutadiene, hexadiene, ethylhexadiene, and the like. The polymerized conjugated dienes may be employed individually or as mixtures or copolymers with one another. Hydrogenated derivatives of conjugated dienes may also be employed. Polybutadiene and polyisoprene are presently preferred as the midblocks, and of the two, polyisoprene is particularly preferred. The midblocks may contain small amounts of a monovinyl aromatic material, but in the preferred case, are predominantly polymerized conjugated diene or mixtures of the same.

The block copolymer of the PSA of the invention may also be crosslinked. In general, crosslinking improves the solvent resistance and high temperature cohesive strength of the adhesive. In addition, crosslinking may make the adhesive more suitable for a broader range of applications. Various agents may be employed to facilitate crosslinking of the adhesive. These agents are known to those of skill in the art and may be used in combination with heat, ultraviolet radiation or electron beam radiation to effectuate crosslinking. A crosslinking agent may be present in the pressure sensitive adhesive of the present invention in an amount of from 0 to about 50 parts by weight per 100 parts of copolymer elastomer, more preferably in an amount of from about 1 to about 10 parts by weight.

The adhesive of the present invention may also be modified with supplementary materials including pigments, dyes, fillers, stabilizers, antioxidants, and the like.

The adhesive composition of the present invention may be applied to a substrate from a solution of up to about 60% by weight solids of the ingredients in a solvent such as toluene, the solvent being removed by evaporation prior to crosslinking by exposure to the radiation. Alternatively, the ingredients may be emulsified and the adhesive applied to a substrate as 50–60% by weight solids water-based emulsions, the water being removed by evaporation prior to crosslinking. Adhesives of the present invention may also be applied to a substrate as a 100% solids hot melt.

The present invention is also directed to a film and to a tape comprising the PSA. The tape is useful in a number of applications. These applications include removable tapes, low unwind noise tapes, tapes for use in cold environments, masking tapes, packaging tapes, medical tapes, autoclave indicator tapes, labels, facestock and protective sheeting.

In one embodiment of the invention the tape comprises a transfer tape, i.e., a film having no backing. Transfer tapes are typically provided on a release carrier to facilitate their handling. In another embodiment of the invention, the tape comprises a backing having first and second major surfaces and a layer of the PSA coated on at least one major surface. The backing may comprise paper, cloth, foil or polymer. In either embodiment, the tape may also comprise a foamed PSA. Foaming may be accomplished, for example, by incorporating a foaming or blowing agent into the block copolymer. Typically, the foaming or blowing agent is mixed with the block copolymer at a temperature below the decomposition temperature of the blowing agent. Upon heating to at least the decomposition temperature, the foaming or blowing agent decomposes and liberates a gas, such as $N_2$, $CO_2$, or $H_2O$, and imparts a cellular structure to the adhesive. Examples of foaming or blowing agents include synthetic azo-, carbonate-, and hydrazide-based molecules. Specific examples include Celogen™ OT (4,4' oxybis (benzenesulfonylhydrazide), Hydrocerol™ BIF (preparations of carbonate compounds and polycarbonic acids), Celogen™ AZ (azodicarboxamide) and Celogen™ RA (p-toluenesulfonyl semicarbazide).

The present invention is illustrated by the examples herein, but the particular materials and Samounts thereof recited in these examples, as well as other conditions and details, should not be construed to unduly limit this invention.

EXAMPLE 1

Three symmetric polystyrene-polyisoprene star block copolymers [(S-I)$_n$Y] and two linear polystyrene-polyisoprene-polystyrene block copolymers [S-I-S] were prepared such that the polystyrene endblocks had different molecular weights. Polymerization reactions were conducted in single neck round bottom flasks equipped with Rotoflo™ stopcocks and magnetic stirring bars. All transfers of solvents, monomers and coupling agents into the flasks were conducted through the stopcock either under high vacuum conditions or under argon atmosphere. The star block copolymers were prepared by charging a first reactor vessel with 150 mL dry Analytical Reagent (AR) grade cyclohexane (available from Mallinckrodt Chemicals Co., Paris, Ky.), 12 wt % sec-butyllithium in cyclohexane (available from Lithium Corporation of America, Bemmer City, N.C.), and 99% pure styrene (available from Aldrich Chemical Company, Milwaukee, Wis.) under argon protection. The reactor was placed in a water bath at 40° to 45° C. with stirring for one hour to obtain a living polystyrene endblock. Quantities of the above-mentioned chemicals are given in Table 1. A second reactor was charged with 1500 mL purified cyclohexane and 99% pure isoprene (available from Goodyear Tire & Rubber Co., Akron, Ohio). The living styrene polymer solution from the first reactor was transferred through a cannula, under argon atmosphere, into the second reactor vessel. The contents were allowed to polymerize for a minimum of two hours at 50° to 60° C. to complete formation of a styrene-isoprene [S-I] diblock copolymer. Dry divinylbenzene (DVB) (available from Dow Chemical Company, Midland, Mich.) was then added to the vessel in an amount several times that of the initiator, as indicated in Table 1, and allowed to react for two hours at 50°–60° C. and then left overnight at room temperature to form the star structure. The reaction was terminated with 1 mL of AR grade isopropyl alcohol (available from Mallinckrodt Chemicals Co., Paris, Ky.), previously purged with argon, followed by 1–2% (based on polymer weight) of octadecyl-3,5,-di-tert-butyl-4-hydroxyhydrocinnamate (Irganox™ 1076) antioxidant (available from Ciba-Geigy Corp., Hawthorne, N.Y.) added to stabilize the linked block copolymer. To recover, the linked block copolymer, along with any remaining unlinked diblock, was precipitated into AR grade isopropanol and dried in a vacuum oven at 50° C. for three days.

The linear SIS block copolymers were prepared by charging a first reactor vessel with 150 mL dry Analytical Reagent (AR) grade cyclohexane (available from Mallinckrodt Chemicals Co., Paris, Ky.), 12 wt % sec-butyllithium in cyclohexane (available from Lithium Corporation of America, Bemmer City, N.C.), and 99% pure styrene (available from Aldrich Chemical Company, Milwaukee, Wis.) under argon protection. The reactor was placed in a water bath at 40°–45° C. with stirring for about one hour to obtain a living polystyrene endblock. Quantities of the above-mentioned chemicals are given in Table 1. A second reactor was charged with 700 mL purified cyclohexane and 99% pure isoprene (available from Goodyear Tire & Rubber Co., Akron, Ohio). The living styrene polymer solution from the first reactor was transferred through a cannula, under argon atmosphere, into the second reactor vessel. The contents were allowed to polymerize for a minimum of three hours at 50°–60° C. to complete formation of a styrene-isoprene [S-I] diblock copolymer. A second charge of 99% pure styrene was then added to the living diblock copolymer solution, under argon protection, to form the linear triblock copolymer. Quantities of monomers are shown in Table 1. The polymerization was allowed to take place at 50°–60° C. for two hours and then was left overnight at room temperature. The reaction was terminated with 1 mL of AR grade isopropyl alcohol, previously purged with argon, followed by 1–2% (based on polymer weight) of octadecyl-3,5,-di-tert-butyl-4-hydroxyhydrocinnamate (Irganox™ 1076) antioxidant added to stabilize the linked block copolymer. To recover, the triblock copolymer was precipitated into AR grade isopropanol and dried in a vacuum oven at 50° C. for three days.

TABLE 1

| Polymer | secBuLi (mmole) | styrene 1st charge (g) | isoprene (g) | styrene 2nd charge (g) | DVB (mmole) |
|---|---|---|---|---|---|
| A | 1.0 | 11.0 | 100 | — | 10.0 |
| B | 1.0 | 7.0 | 100 | — | 10.0 |
| C | 1.0 | 5.0 | 100 | — | 10.0 |
| D | 0.5 | 4.0 | 49 | 4.0 | — |
| E | 0.4 | 4.5 | 55 | 4.5 | — |

The number average molecular weights ($M_n$) of the polystyrene endblocks, arms, star block copolymers, and triblock copolymers were determined by size exclusion chromatography (SEC). The molecular weights were characterized using a Hewlett-Packard Model 1082B size exclusion chromatograph equipped with two bimodal Zorbax PSM Kits (two columns at 60-s A). Individual endblock, arm, star and triblock copolymer samples were dissolved in filtered, AR grade tetrahydrofuran (available from Mallinckrodt Chemical Co., Paris, Ky.) and passed through columns at a rate of 0.5 mL per minute at 40° C. The refractive indices of the endblocks, arms, star block, and triblock copolymers were measured using a Hewlett-Packard Model 1037A differential refractometer detector and compared against the calibration curves obtained using polystyrene standards. All molecular weight averages are polystyrene equivalent molecular weights and are summarized in Table 2. The total weight percent polystyrene was determined from the monomer charge ratio of styrene and isoprene in each polymer.

TABLE 2

| Polymer | Calculated Formula | wt % styrene | wt % diblock | $M_n$ (g/mole*) 13,000 | arm | star |
|---|---|---|---|---|---|---|
| A | $(S_{11}\text{—}I_{100})_{10}Y$ | 10 | 5 | 13,000 | 140,000 | 1,109,000 |
| B | $(S_7\text{—}I_{100})_{10}Y$ | 7 | 7 | 6,400 | 134,000 | 934,000 |
| C | $(S_5\text{—}I_{100})_{10}Y$ | 6 | 6 | 4,500 | 140,000 | 950,000 |
| D | $S_8\text{—}I_{100}\text{—}S_8$ | 14 | 0 | 7,300 | triblock = 114,000 | |
| E | $S_{11}\text{—}I_{140}\text{—}S_{11}$ | 14 | 0 | 12,000 | triblock = 204,000 | |

*Determined by SEC using polystyrene standards (no branching correction)

EXAMPLE 2

The block copolymers of Example 1 were formulated into adhesive compositions by combining the block copolymer elastomers with each of two tackifier systems, the first being an aliphatic tackifier resin system that was substantially incompatible with the polystyrene endblock segment of the copolymer, and the second being an aromatic modified tackifier system that was substantially compatible with the polystyrene endblock segment of the copolymer. The aliphatic tackifier system comprised a mixture of Escorez 1310, an aliphatic petroleum hydrocarbon resin having a softening point (ring & ball) of 94° C., a specific gravity at 18° C. of 0.96, and a molecular weight of 1152 (available from Exxon Chemical corp., Houston, Tex.), and Zonarez A-25, a poly alpha-pinene liquid resin having a softening point (ring & ball) of 25° C. and a molecular weight of 400 (available from Arizona Chemical Co, Panama City, Fla.). The aromatic modified tackifier system comprised a mixture of Escorez 2393, an aliphatic/aromatic petroleum hydrocarbon resin with a softening point (ring & ball) of 92° C. and a molecular weight of 980 (available from Exxon Chemical Corp., Houston, Tex.), and Piccovar AP-25, an aromatic hydrocarbon liquid resin having a softening point (ring & ball) of 31.5° C. and a specific gravity at 25° C. of 1.01 (available from Hercules, Inc., Wilmington, Del.).

The block copolymer elastomers were formulated with the tackifier resin systems as indicated in Table 3, with the amounts of elastomer and tackifiers given in parts by weight. The adhesives were formulated such that 50% of the total formulation was block copolymer by weight) and the resulting tackified adhesive had an estimated glass transition temperature $T_g$ of about 245° K for the tackified polyisoprene fraction of the adhesive as predicted by the Fox equation. In calculating the $T_gS$ of the adhesive systems, polyisoprene was assumed to $T_g$ of 213° K, and the tackifiers Escorez 1310, Escorez 2393, Zonarez A-25, and Piccovar AP-were assumed to have $T_g$s of 318° K, 318° K, 253° K, and 253° K, respectively.

TABLE 3

| | | Adhesive Formulation | | | | |
|---|---|---|---|---|---|---|
| | | Elastomer | Tackifier fraction (parts by wt) | | | |
| Adhesive | Polymer | fraction (parts by wt) | Escorez 1310 | Zonarez A-25 | Escorez 2393 | Piccovar AP-25 |
| 1 | A | 100 | 46.2 | 53.8 | 0 | 0 |
| 2 | A | 100 | 0 | 0 | 46.2 | 53.8 |
| 3 | B | 100 | 50.6 | 49.4 | 0 | 0 |
| 4* | B | 100 | 0 | 0 | 50.6 | 49.4 |
| 5 | C | 100 | 52.6 | 47.4 | 0 | 0 |
| 6* | C | 100 | 0 | 0 | 52.6 | 47.4 |
| 7 | D | 100 | 46.2 | 53.8 | 0 | 0 |
| 8* | D | 100 | 0 | 0 | 46.2 | 53.8 |
| 9 | E | 100 | 46.2 | 53.8 | 0 | 0 |
| 10 | E | 100 | 0 | 0 | 46.2 | 53.8 |

*Sample of the invention.

The resins and block copolymer were weighed dry and dissolved in toluene to give a 35% solids by weight solution. The solutions were separately knife coated onto 38.1 micrometer (1.5 mil) thick polyethylene terephthalate (PET) film at a coating weight of about 41.94 g/m² (10 grains/24 in²). The coatings were dried for three minutes at room temperature (22° C. or 72° F.) followed by 2 minutes at 180° F. (82° C.) in a convection oven and then removed from the oven. The elastic index of each adhesive tape was then determined as described below. These measurements were conducted in a controlled environment testing room maintained at 70° F. (21° C.) and 50% relative humidity.

The elastic index of each adhesive composition was measured to determine the amount of stress a tape sample could dissipate from a given load over a set time period. A computer controlled motorized step Positioning System (available from Parker Hannifin Corp., Daedal Division, Rohnert Park, Calif.), equipped with a LeBow Products Model 3397–25 load cell (available from Eaton Corp., Carol Stream, Ill.), was used. Stainless steel test panels measuring three inches by three inches (7.6 cm×7.6 cm) were then prepared by cleaning with one wipe of diacetone and three wipes of heptane. A tape sample measuring 0.75 inches wide (1.9 cm) by about 8 inches long (20.3 cm) was fixed to the test panel with firm finger pressure, and the section applied to the test panel was then trimmed and peeled away so that 0.25 inches (0.64 cm) remained adhered to the test panel. The length of tape extending from the test panel was then tabbed to itself so that there was no free adhesive to interfere with mounting in the jaws. The test panel was placed in the lower clamp of the Positioning System such that the tabbed sample extended vertically through the upper clamp, and the lower clamp was secured. The upper clamp was then secured, fixing the tabbed sample in a vertical orientation. A pre-load of 100 grams was applied to remove any slack from the tape, and the unit was then operated at a crosshead speed of 2.0 inches per minute (5.08 cm/min) until a total load of 1000 grams was applied to the tape. The positioning system then stopped and the tape was allowed to relax for three minutes. The elastic index was determined as a ratio of the remaining force after 180 seconds of relaxation to the initial force (1000 grams). The elastic index measured for each sample is shown in Table 4. The values shown represents an average of 3 mearsurements.

TABLE 4

| Adhesive | Calculated Formula | Endblock $M_n$ (g/mole) | Tackifier type | Elastic Index |
|---|---|---|---|---|
| 1 | $(S_{11}-I_{100})_nY$ | 13,000 | aliphatic | 0.89 |
| 2 | $(S_{11}-I_{100})_nY$ | 13,000 | aromatic | 0.84 |
| 3 | $(S_7-I_{100})_nY$ | 6,400 | aliphatic | 0.82 |
| 4* | $(S_7-I_{100})_nY$ | 6,400 | aromatic | 0.48 |
| 5 | $(S_5-I_{100})_nY$ | 4,500 | aliphatic | 0.47 |
| 6* | $(S_5-I_{100})_nY$ | 4,500 | aromatic | 0.17 |
| 7 | $S_8-I_{100}-S_8$ | 7,300 | aliphatic | 0.58 |
| 8* | $S_8-I_{100}-S_8$ | 7,300 | aromatic | 0.20 |
| 9 | $S_{11}-I_{140}-S_{11}$ | 12,000 | aliphatic | 0.80 |
| 10 | $S_{11}-I_{140}-S_{11}$ | 12,000 | aromatic | 0.79 |

*Sample of the invention

The data in Table 4 show that the adhesives of the invention (Adhesives 4, 6 and 8) provide for tapes having greatly reduced elastic indices compared to their aliphatic analogues.

More specifically, comparing Adhesives 1 and 2, each of which comprised symmetric star block copolymers having endblock molecular weights of 13,000, a slight reduction in elastic index occurred as a result of using an aromatic instead of aliphatic tackifier. Comparing Adhesives 1 and 3, a slight reduction in elastic index occurred as a result of reducing the endblock molecular weight of the symmetric star from 13,000 to 6,400. Similarly, comparing Adhesives 1 and 5, a reduction in elastic index occurred as a result of reducing the endblock molecular weight of the symmetric star from 13,000 to 4,500, the reduction being larger in this case. Surprisingly, however, Adhesives 4 and 6 (which comprised both a low molecular weight endblock and a substantially endblock-compatible tackifier) showed a very large decrease in elastic index. Adhesive 4 provided a decrease in elastic index of 41.7% compared to Adhesive 3. Adhesive 6 provided a decrease in elastic index of 66% compared to Adhesive 5.

A similar analysis may be performed on Adhesives 7–10 which comprised triblock copolymers. Comparing Adhesives 9 and 10, a slight decrease in elastic index resulted from using an aromatic instead of aliphatic tackifier. Comparing Adhesives 9 and 7, a decrease in elastic index occurred as a result of lowering the endblock molecular weight from 12,000 to 7,300. Surprisingly, Adhesive 8 (which comprised both a low molecular weight endblock and a substantially endblock-compatible tackifier) showed a very large decrease in elastic index. Adhesive 8 provided a 65.7% reduction in elastic index compared to Adhesive 7.

A visual representation of stress relaxation characteristics of the block copolymer pressure sensitive adhesives, showing elastic index as a function of polystyrene endblock molecular weight, molecular structure, and tackifier type, is depicted in FIG. 1. From this Figure, it is apparent that the adhesives having polystyrene endblocks with molecular weights less than 8,000 grams/mole showed a large decrease in elastic index when tackified with the more aromatic tackifier system as compared with the aliphatic tackifier system. This decrease in elastic index is indicative of the improved ability of the adhesive to dissipate stress, so that tapes made from these adhesives will resist lifting.

EXAMPLE 3

A polymodal asymmetric elastomeric block copolymer having mixed molecular weight endblocks, believed to have been made according to Example 1 in U.S. Pat. No. 5,296,547, was provided. The number average molecular weights ($M_n$) of the polystyrene endblocks and polyisoprene arms, the mole fraction of high molecular weight polystyrene endblocks, and the estimated weight percent styrene, were reported as shown in Table 5.

TABLE 5

| Polymer | Calculated Formula | $M_n$ (g/mole) | | | % High MW arms | wt % styrene |
|---|---|---|---|---|---|---|
| | | $S_1$ | $S_2$ | I | | |
| F | $(S_{22}-I_{98})_{.24}Y(I_{98}-S_5)_{.76}$ | 5,400 | 21,600 | 98,000 | 24 | 8.7 |

The polymodal asymmetric block copolymer was formulated into two different adhesive compositions by combining the block copolymer elastomers with each of two tackifier systems as described in Example 2.

The block copolymer elastomers were formulated with the tackifier resin systems as indicated in Table 6, with the amounts of elastomer and given as parts by weight. The adhesives were formulated such that 50% of the total formulation was block copolymer (by weight) and the resulting tackified adhesive had an estimated glass transition temperature of about 245° K for the tackified polyisoprene fraction of the adhesive as predicted by the Fox equation. In calculating the $T_g$'s of the adhesive systems, polyisoprene was assumed to have a $T_g$ of 213° K, and the tackifiers Escorez 1310, Escorez 2393, Zonarez A-25, and Piccovar AP-25 were assumed to have $T_g$'s of 318° K, 318° K, 253° K, and 253° K, respectively.

TABLE 6

| Adhesive Formulation | | | | | | |
|---|---|---|---|---|---|---|
| | | Elastomer fraction | Tackifier fraction (parts by weight) | | | |
| Adhesive | Polymer | (parts by weight) | Escorez 1310 | Zonarez A-25 | Escorez 2393 | Piccovar AP-25 |
| 11 | F | 100 | 46.2 | 53.8 | 0 | 0 |
| 12* | F | 100 | 0 | 0 | 46.2 | 53.8 |

*Sample of the invention.

The resins and block copolymer were weighed dry and dissolved in toluene to give a 35% solids by weight solution. The solutions were separately knife coated onto 38.1 micrometer (1.5 mil) thick polyethylene terephthalate (PET) film at a coating weight of about 41.94 g/m² (10 grains/24 in²). The coatings were dried for three minutes at room temperature (22° C. or 72° F.) followed by 2 minutes at 180° F. (82° C.) in a convection and removed from the oven. The elastic index of each adhesive coated tape was then determined by measuring the elastic index as described in Example 2.

TABLE 7

| Adhesive | Elastomer formulation | low $M_n$ endblock (g/mol) | high $M_n$ endblock (g/mol) | Tackifier type | Elastic index |
|---|---|---|---|---|---|
| 11 | $(S_{22}-I_{98})_{.24}Y(I_{98}-S_5)_{.76}$ | 5,400 | 21,600 | aliphatic | 0.70 |
| 12* | $(S_{22}-I_{98})_{.24}Y(I_{98}-S_5)_{.76}$ | 5,400 | 21,600 | aromatic | 0.57 |

*Sample of the invention.

Adhesive 11 (which was formulated using a polymodal asymmetric star block copolymer having low molecular weight endblocks and aliphatic tackifier) was determined to have an elastic index of 0.70. Adhesive 12 (which was formulated using the same star block copolymer as Adhesive 11 and aromatic tackifier) was found to have an elastic index of 0.57. This decrease in the elastic index may be attributed to the combination of an endblock-compatible tackifier system and an endblock having a molecular weight less than 8,000. It is noted that the decrease in elastic index shown by comparing Adhesives 11 and 12 is less dramatic than that shown in FIG. 1 for a symmetric star or linear block copolymer. This is because of the lower percentage of low molecular weight polystyrene endblocks in the block copolymer of Adhesives 11 and 12. Generally, the higher the percentage of endblocks having a molecular weight below 8,000 in the mixed molecular weight endblocks, the greater the decrease one would see in the elastic index. The decrease in elastic index is again indicative of improved ability to dissipate stress, so that tapes made from these adhesives will resist lifting with stress.

We claim:

1. A method of reducing the elastic index of a block copolymer pressure sensitive adhesive composition comprising the steps of:
   (1) providing a block copolymer comprising at least one endblock and at least one midblock, wherein said at least one endblock comprises a polymerized monovinyl aromatic having a number average molecular weight less than 8,000 and said at least one midblock comprises a polymerized conjugated diene or hydrogenated derivative thereof;
   (2) providing a tackifier or oil that is sufficiently compatible with said at least one endblock; and
   (3) mixing said tackifier or oil with the block copolymer and forming a blend of an effective amount of said tackifier or oil with said at least one endblock so as to reduce the elastic index of the resulting adhesive composition by at least about 10%.

2. The method of claim 1 wherein the elastic index is less than 0.7.

3. The method of claim 1 wherein the at least one endblock has a number average molecular weight between about 3,000 and about 7,000.

4. The method of claim 1 wherein said block copolymer of the providing step is a polymodal, asymmetric star block copolymer.

5. The method of claim 4 wherein 30 to 100 percent of the total arms of said polymodal, asymmetric star block copolymer comprise endblocks each having a number average molecular weight less than 8,000.

6. The method of claim 1 wherein the adhesive formed by the method comprises:
   (a) about 100 parts by weight of said block copolymer;
   (b) at least about 20 parts by weight of said tackifier or at least about 5 parts by weight of said oil; and
   (c) 0 to about 50 parts of a crosslinking agent.

7. The method of claim 1 wherein the adhesive formed by the method comprises:
   (a) about 100 parts of a polymodal, asymmetric block copolymer having the structure QnY wherein Q represents an arm of the block copolymer and has the structure S-B, n represents the number of arms and is at least 3, Y is the residue of a multifunctional coupling agent, S comprises a polymerized monovinyl aromatic segment and B comprises a polymerized conjugated diene or hydrogenated derivative thereof, wherein 30 to 100 percent of the total arms of said polymodal, asymmetric block copolymer comprise endblocks having a number average molecular weight less than 8,000 and
   (b) from about 50 to about 200 parts by weight of at least one tackifier comprising an aromatic compound that is sufficiently compatible with said endblock and said midblock to reduce the elastic index of the pressure sensitive adhesive composition by at least 10%.

* * * * *